(12) United States Patent
Sakaguchi et al.

(10) Patent No.: US 7,914,382 B2
(45) Date of Patent: Mar. 29, 2011

(54) DUAL TYPE CONSTANT VELOCITY UNIVERSAL JOINT

(75) Inventors: Akio Sakaguchi, Shizuoka (JP); Kousei Kuriki, Shizuoka (JP)

(73) Assignee: NTN Corporation, Osaka (JP)

( * ) Notice: Subject to any disclaimer, the term of this patent is extended or adjusted under 35 U.S.C. 154(b) by 183 days.

(21) Appl. No.: 11/991,848

(22) PCT Filed: Oct. 20, 2006

(86) PCT No.: PCT/JP2006/320932
§ 371 (c)(1),
(2), (4) Date: Jan. 28, 2009

(87) PCT Pub. No.: WO2007/049512
PCT Pub. Date: May 3, 2007

(65) Prior Publication Data
US 2009/0298599 A1   Dec. 3, 2009

(30) Foreign Application Priority Data
Oct. 24, 2005   (JP) .................................. 2005-308856

(51) Int. Cl.
*F16D 3/00*   (2006.01)
(52) U.S. Cl. ..................... 464/140; 464/906; 464/182
(58) Field of Classification Search ................. 464/140, 464/182, 906
See application file for complete search history.

(56) References Cited

U.S. PATENT DOCUMENTS

| | | | |
|---|---|---|---|
| 3,017,755 A * | 1/1962 | Miller | 464/140 |
| 3,218,827 A | 11/1965 | Aucktor | |
| 4,112,709 A * | 9/1978 | Krude | 464/117 |
| 4,723,464 A * | 2/1988 | Welschof et al. | 475/222 |
| 5,916,055 A * | 6/1999 | Wormbaecher | 475/222 |
| 2004/0097292 A1 | 5/2004 | Dine | |

(Continued)

FOREIGN PATENT DOCUMENTS

DE   29 49 714   6/1981

(Continued)

OTHER PUBLICATIONS

Supplementary European Search Report dated Jul. 30, 2009 in European Application No. 06821993.0.*

(Continued)

*Primary Examiner* — Aaron Dunwoody
(74) *Attorney, Agent, or Firm* — Wenderoth, Lind & Ponack, L.L.P.

(57) ABSTRACT

A dual type constant velocity universal joint solves the problems of greasing work efficiency and lubricating ability of a double Cardan Joint. The dual type constant velocity universal joint includes two constant velocity universal joints. Each constant velocity universal joint includes: a cylindrical outer ring in which a plurality of guiding grooves that extend in an axial direction are formed on a spherical inner circumferential surface; an inner ring in which a plurality of guiding grooves that extend in an axial direction are formed on a spherical outer circumferential surface; balls for torque transmission each of which is disposed in each of a plurality of ball tracks which are through coordination between the guiding grooves of the outer ring and the guiding grooves of the inner ring; and a cage 5 for holding the balls. The outer ring are coaxially integrated with back to back, and a place between the outer circumferential surface on the opening side of the outer ring and shafts connected to the inner ring is covered with a boot having a metal ring.

8 Claims, 5 Drawing Sheets

U.S. PATENT DOCUMENTS

2005/0239560 A1 * 10/2005 Gehrke ........................ 464/140

FOREIGN PATENT DOCUMENTS

| DE | 3343794 A1 * | 6/1985 |
| --- | --- | --- |
| DE | 43 06 121 | 9/1994 |
| JP | 04-358970 | 12/1992 |
| JP | 07-269585 | 10/1995 |
| JP | 11-159538 | 6/1999 |
| JP | 2004-162882 | 6/2004 |

OTHER PUBLICATIONS

International Search Report mailed Nov. 14, 2006 for International Application No. PCT/JP2006/320932.

* cited by examiner

FIG. 5

DUAL TYPE CONSTANT VELOCITY UNIVERSAL JOINT

TECHNICAL FIELD

The present invention relates to a dual type constant velocity universal joint which is formed by integrating two pieces of constant velocity universal joints and which is mainly used for a drive axle of a vehicle. In particular, the present invention relates to a dual type constant velocity universal joint which is preferable for use as a constant velocity universal joint for a drive axle of a rough-terrain crane vehicle, farm tractor or the like that requires a large steering angle.

BACKGROUND ART

Conventionally, in many drive axles for farm tractors or the like that require a large steering angle, the differential gear output shaft is coupled to the wheels via a constant-velocity type double Cardan joint. While a double Cardan joint requires a long axial length and a large outer diameter, it can have an intersection angle exceeding 50°. The constant-velocity type double Cardan joint is ordinarily lubricated by grease that has been filled in an axle housing. In the meantime, a drive axle of a large vehicle such as a rough-terrain crane vehicle adapted to on-road driving uses one constant velocity universal joint of Rzeppa-type or ball-fixed type (hereinafter sometimes referred to as "BJ" or "BJ-type") with bellows boot to simplify the mechanism (see Patent Document 1). The BJ type includes an outer ring on which a curved track groove is formed in an axial direction on a spherical inner diameter surface, an inner ring on which a curved track groove is formed in an axial direction on a spherical outer diameter surface, a plurality of balls for torque transmission disposed in ball tracks that are formed through coordination between the track groove of the outer ring and the track groove of the inner ring corresponding thereto, and a cage provided with pockets for holding the balls.

When a constant velocity universal joint of BJ-type is used for a drive shaft, an axle section (driven shaft) that integrally extends from one end of the outer ring in an axial direction is coupled to a wheel bearing, and a shaft (drive shaft) that is spline engaged with a shaft hole of the inner ring is coupled to a slide-type constant velocity universal joint. When there is an angular displacement between the two axes, that is, between an axle section of the outer ring and a shaft of the inner ring, the balls housed in the pockets of the cage are always held in an angle bisecting plane of any operating angle, whereby constant velocity of the joint can be maintained. The operating angle herein refers to an angle created by the axle section of the outer ring and the shaft of the inner ring.

In the meantime, a drive axle of a large vehicle such as a rough-terrain crane vehicle includes, in a section inside of the wheel hub, a so-called hub reduction including a reducer such as a planetary gear mechanism to prevent large drive torque from acting on the BJ-type constant velocity universal joint.
Patent Document 1: Japanese Patent Laid-open Publication No. Heisei 4-358970

DISCLOSURE OF THE INVENTION

Problems to be Solved by the Invention

The drive axle including a BJ with a bellows boot must allow a large angle exceeding 30° when steering the wheels. Accordingly, such a drive axle has a longer axial direction length of the boot and a larger outer diameter than an ordinary drive axle. In the case of a rough-terrain crane vehicle including a hub reduction, the number of revolutions when the vehicle is driving straight at a high speed exceeds 1300 rpm. A synergetic effect of the high speed revolution and the large diameter of the BJ causes a problem that the boot swells and is deformed. To address this, although improvement is being made mainly on the shape of the bellows boot and on the material thereof to increase hardness of the bellows boot, such improvement is not enough to inhibit deformation of the boot. There are increasing cases where the problem of deformation of the boot cannot be solved merely by improvement of the shape and material of the bellows boot because of the relationship between the required BJ size and the number of revolutions.

In addition, in the case of a drive axle using one BJ, when excessive torque caused by sudden start or the like acts thereon in the case where the operating angle of the BJ has increased, damage can occur at a portion where the ball guiding groove is shallow. In other words, when the operating angle of the BJ has increased, the ball moves to the rear side of the ball guiding groove. The rear side of the ball guiding groove has a smaller groove depth. Accordingly, a contact ellipse of the ball in the ball guiding groove pushes out an edge of an edge chamfer of the ball guiding groove. When a large load accompanying excessive torque acts on the ball under this state, the outer spherical surface of the inner ring in the vicinity of the ball guiding groove rises and thus it is deformed. When the outer spherical surface of the inner ring is deformed, operability of the joint may sometimes be reduced or a chamfer edge of the ball guiding groove may be chipped. To prevent such damage, the outer diameter of the BJ must be increased.

Furthermore, there is a structural restriction in a drive axle using one BJ also that a king pin center, which is the center of steering rotation of the wheel, must match the center of the angled bending of the BJ (that is, the intersection of the 2 axes; the axle section of the outer ring and the shaft of the inner ring).

An object of the present invention is to provide a constant velocity universal joint which can inhibit deformation of a boot at a high speed revolution, which can have an operating angle exceeding 50° without increasing the size of the outer diameter size of the BJ, and which does not require precise position alignment with a king pin center.

Means for Solving the Problems

To solve the foregoing problem, the present invention includes two constant velocity universal joints. Each constant velocity universal joint includes: a cylindrical outer ring in which a plurality of guiding grooves that extend in an axial direction are formed on a spherical inner circumferential surface; an inner ring in which a plurality of guiding grooves that extend in an axial direction are formed on a spherical outer circumferential surface; balls for torque transmission each of which is disposed in each of a plurality of ball tracks which are formed through coordination between the guiding grooves of the outer ring and the guiding grooves of the inner ring; and a cage for holding the balls. The outer rings are coaxially integrated with back to back, and a portion between the outer circumferential surface on the opening side of the outer ring and a shaft connected to the inner ring is covered with a boot having a metal ring.

The dual type constant velocity universal joint according to the present invention uses a boot having a metal ring (of diaphragm type) in place of a conventional bellows boot. Therefore, the problem of deformation of the boot when rotating at a high speed can be resolved. Specifically, in the case where the reference axis diameter of the shaft to be coupled to the inner ring of the BJ is 2 inches, the maximum number of revolutions of a conventional bellows boot at the operating angle 0° would be approx. 1300 rpm. However, no problem of deformation will occur in the BJ according to the present invention which uses a boot having a metal ring, even when the number of revolutions is 2000 rpm or higher.

In addition, since the dual type constant velocity universal joint according to the present invention includes two BJs, the dual type constant velocity universal joint as a whole can actualize twice as large as the operating angle of one BJ. Specifically, tightening of two BJs of a compact disc type in an axial direction by a bolt enables reduction of the operating angle per BJ to 18° or less. As a result of this, even at an operating angle at which a part of a contact ellipse of the ball would push out the chamfer of the guiding grooves of the inner ring in a conventional joint, deformation of the chamfer of the guiding groove caused by load torque can be prevented without increasing the size of the outer diameter of the BJ.

To coaxially integrate the outer rings back to back, for example, a disk-shaped adapter flange having a center through-hole is sandwiched between two outer rings and a bolt is inserted in the two outer rings and the adapter flange to integrate them. Alternatively, two outer rings may be formed on opposite sides of a cylindrical component which has been integrated.

Advantage of the Invention

As described above, by integrating two constant velocity universal joints, the present invention can actualize an operating angle or an intersection angle that is twice as large as the dual type constant velocity universal joint as a whole. For example, in the case where the operating angle or the intersection angle for one constant velocity universal joint is 35°, the intersection angle which is twice as large as it, that is 70°, can be actualized as a whole. As a result of this, the operating angle is approximately half of the case where one constant velocity universal joint is used. In addition, deformation of the guiding grooves because the contact ellipse thereof has pushed out is also more advantageously prevented, whereby the size reduction of the constant velocity universal joint can be achieved.

In addition, adoption of a boot having a metal ring can inhibit formation of a boot when rotating at a high speed. Accordingly, the dual type constant velocity universal joint is preferable for a drive axle of a rough-terrain crane vehicle mounted with a hub reduction.

Use of two constant velocity universal joints eliminates the necessity of precise position alignment of the king pin center, which is the steering center of the wheel, with the bending center of the joint. Therefore, freedom in the design of a drive axle increases.

Use of a disc-type constant velocity universal joint and of a boot having a metal ring enables a compact joint which is short in an axial direction.

DETAILED DESCRIPTION OF THE INVENTION

Figure 1:
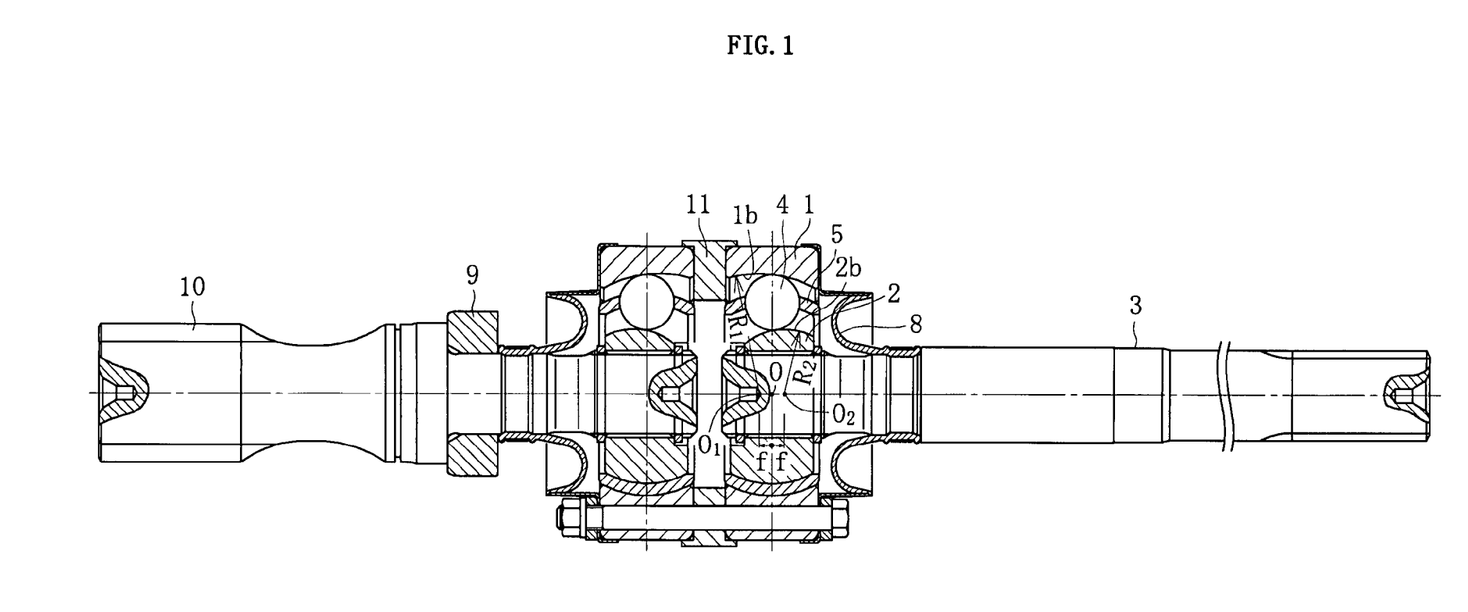
FIG. 1 is a longitudinal sectional view of a dual type constant velocity universal joint according to a first embodiment of the present invention in the state where the operating angle is 0°.
Figure 2:
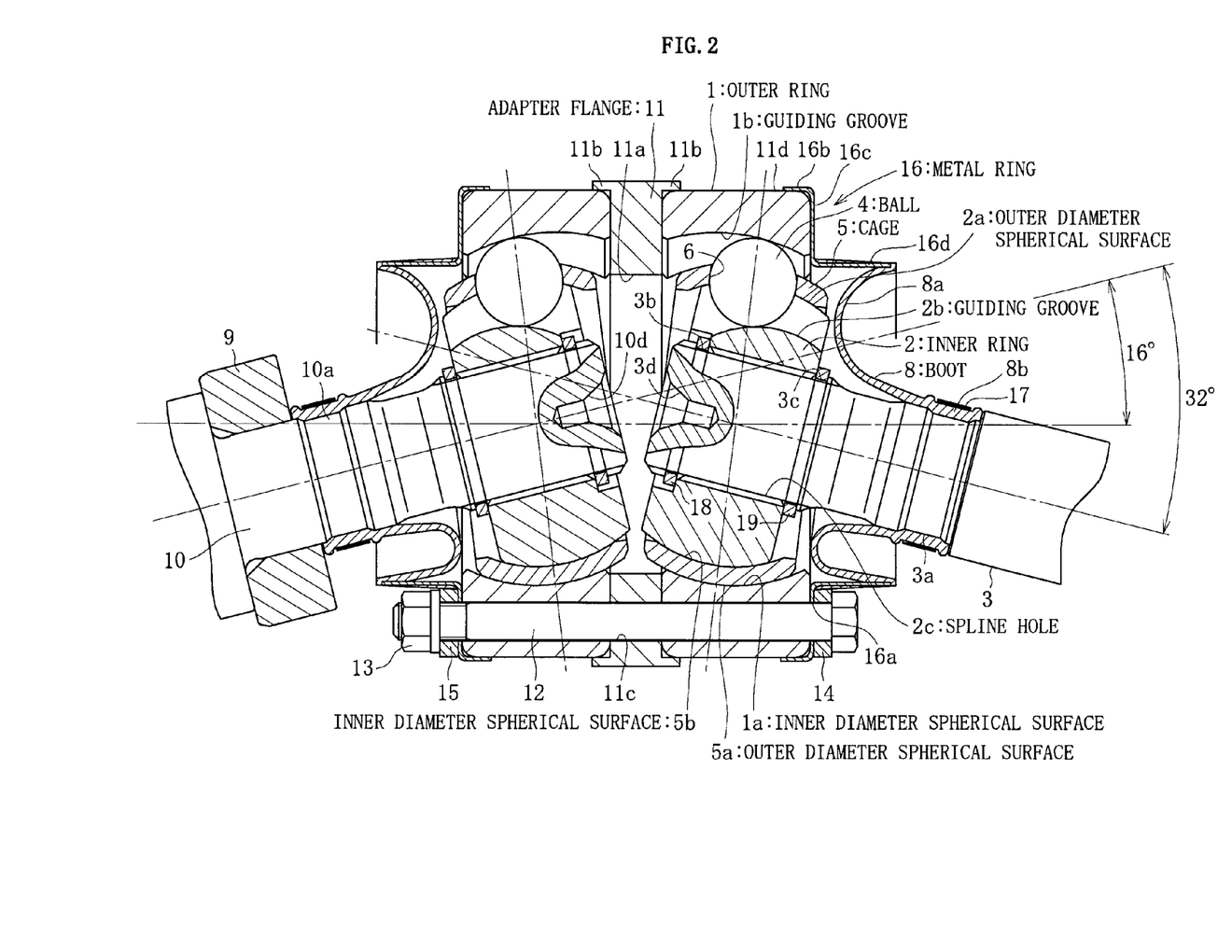
FIG. 2 is a longitudinal sectional view of the state where the joint has become close to the maximum operating angle.

Embodiments of the present invention will be hereinafter described with reference to FIGS. 1 to 5. FIGS. 1 and 2 show a first embodiment of a dual type constant velocity universal joint according to the present invention. FIG. 1 shows the state where the operating angle is 0°, and FIG. 2 shows the state where the operating angle is 32°. The dual type constant velocity universal joint has a structure formed by integrating two ordinary fixed-type constant velocity universal joints of same specifications. The constant velocity universal joint uses balls 4 as torque transmission component. A differential gear-side shaft 3 is connected to one of the joints, and a wheels-side shaft 10 is connected to the other joint. A distal end of the wheels-side shaft 10 is connected to a sun gear of a hub reduction. A slinger 9 is attached to the wheels-side shaft 10. The outer diameter surface of the slinger 9 makes contact with a lip section of an oil seal for preventing leakage of lubricant from a planetary gear of the hub reduction.

For the sake of convenience, the embodiment will now be described with reference to mainly a one-side half of one side half the dual type constant velocity universal joint, that is, one of the two constant velocity universal joints. The one-side half of the dual type constant velocity universal joint, as shown in FIG. 2, includes a cylindrical outer ring 1, an inner ring 2, the shaft 3, the balls 4 for torque transmission, a cage 5 and a boot 8. In the cylindrical outer ring 1, six curved guiding grooves 1b are formed in an axial direction on an inner diameter spherical surface 1a thereof. In the inner ring 2, six curved guiding grooves 2b are formed in an axial direction on an outer diameter spherical surface 2a thereof. The inner ring 2 includes a spline (or serration) hole 2c. One end of the shaft 3 is engaged with the spline hole 2c. Each of the balls 4 for torque transmission is disposed in each of 6 ball tracks that are formed through coordination between the guiding grooves 1b of the outer ring 1 and the guiding grooves 2b of the inner ring 2. The cage 5 holds the balls 4. The boot 8 is disposed between the outer circumferential surface on the opening side of the outer ring 1 and the outer circumferential surface of the shaft 3 (10). Although both the numbers of the guiding grooves 1b, and of the guiding grooves 2b are herein set as 6, they may sometimes be increased to 7, 8, 9, 10, or any preferable number.

The outer ring 1 has a structure formed by integrating the individual outer rings 1 of the two constant velocity universal joints. Specifically, the two outer rings 1 are coaxially integrated in the state where they are matched back to back with the opening sides thereof (on the shafts 3, 10 side) facing outwards. The insides of the right and left outer rings 1 are connected with each other. The term "integrated" herein includes both the case of connecting two outer rings 1 that have been made as separate bodies to integrate them (in the first embodiment) and the case of complete integral molding from a common material (in the second embodiment). In the first embodiment, the two outer rings 1 are integrated with the adapter flange 11 being sandwiched therebetween. When the dual type constant velocity universal joint is used for a drive axle, the center in the width direction of the adapter flange 11 substantially matches an axis of rotation of the king pin.

The adapter flange 11 is a disk-shaped component which has a center through-hole 11a. Cylinder sections for position alignment 11b, 11b are formed in the peripheral part of the adapter flange 11 such that they project leftwards and rightwards. The size of the cylinder sections 11b, 11b is matched with that of the outer diameter of the outer ring. Bolt insertion holes 11c are formed at a plurality of locations in circumferential direction in a section inside of the cylinder section 11b. The peripheral part of the outer ring at a portion where the ball guiding grooves 1b are located is thinner, and the bolt insertion holes 11c are formed at a portion excluding such thin portion, that is, at a plurality of locations at equal intervals in circumferential direction between the guiding grooves. After the positions of the bolt insertion holes 11c are aligned a bolt 12 is inserted thereinto, and a nut 13 is screwed into the distal end of the bolt 12. Numerals 14, 15 denote spring washers.

The outer circumferential surface of the outer ring 1 is a cylindrical surface 11d around the axis line of the outer ring 1 as the center. A metal ring 16 of the boot 8 is engaged with the cylindrical surface 11d on the opening side. The metal ring 16 includes bolt insertion ports 16a at equal intervals in circumferential direction, and the metal ring 16 is tightened to the side surface of the outer ring 1 by the bolt 12 when the two outer rings 1, 1 are connected to the adapter flange 11 by the same bolt 12. The metal ring 16 includes a large diameter section 16b, a flange section 16c and a small diameter section 16d. The large diameter section 16b is engaged with the outer circumferential surface of the outer ring 1. The flange section 16c abuts with the side surface of the outer ring 1. The small diameter section 16d projects in the direction to be separated from the outer ring 1. A liquid packing is interposed between the flange section 16c and the side surface of the outer ring 1 for preventing leakage of grease enclosed in the interior of the joint. A large diameter end 8a of the disk-shaped boot 8 is integrated through vulcanization with the small diameter section 16d of the metal ring 16. A small diameter end 8b of the disk-shaped boot is engaged with a ring-shaped concave section 3a (10a) that is formed on the outer circumferential surface of the shaft 3 (10). A band 17 is fixed to the outer circumferential surface of the small diameter end 8b. The disk-shaped boot 8 has a structure, with a U-shaped cross section, in which the large diameter end 8a and the small diameter end 8b are opposite to each other in radial direction.

The distal end of the shaft 3 is engaged with the spline hole 2c of the inner ring 2. At the same time, relative movement of the shaft 3 with the inner ring 2 is restricted by a rectangular circlip 19 and a round circlip 18 that are engaged with the ring-shaped grooves 3c, 3b, respectively. A center hole 3d (10d) is formed on the distal end surface of the shaft 3 (10) for centering when lathing the shaft 3 (10).

Each of the right and left the constant velocity universal joints has a structure which is called as Rzeppa type, ball-fixed type, or double-offset type as a single unit. In the state where the operating angle is 0° as shown in FIG. 1, the respective centers $O_1$, $O_2$ with radials $R_1$, $R_2$ of the guiding grooves 1b, 2b of the outer ring 1 and the inner ring 2 are offset with respect to the common center O (that is, the center of the joint) of the inner diameter spherical surface 1a of the outer ring 1 and of the outer diameter spherical surface 2a of the inner ring 2 in opposite axial directions by an equal distance f. As a result of this, the ball track that is formed through coordination between the guiding grooves 1b and the guiding grooves 2b corresponding thereto has a wedge shape that is opened toward the opening side of the joint.

The cage 5 is formed of an annular component. The outer circumferential surface thereof is referred to as an outer diameter spherical surface 5a that makes a sliding contact with the inner diameter spherical surface 1a of the outer ring 1, and the inner circumferential surface thereof is referred to as an inner diameter spherical surface 5b that makes a sliding contact with the outer diameter spherical surface 2a of the inner ring 2. Windows 6 are formed through penetration by grinding, milling or the like on the peripheral wall of the cage 5. The number of the windows 6 is the same as the number of the balls 4. The windows 6, which are for example rectangular, are formed at equal intervals in circumferential direction of the cage 5.

The dual type constant velocity universal joint according to the present invention is configured as described above. In the state where the outer ring 1 and the inner ring 2 creates the operating angle 0° as shown in FIG. 1, the ball 4 is held in a plane which includes the center O of the joint and which is perpendicular to the rotational axis line due to the offset effect of respective curvature centers $O_1$, $O_2$ of the guiding groove 1b of the outer ring 1 and of the guiding groove 2b of the inner ring 2, respectively, and torque is transmitted in this state.

Next, in the state where the outer ring 1 and the inner ring 2 at the opposite sides of the dual type constant velocity universal joint are bent to the limit operating angle θ, the dual type constant velocity universal joint as a whole actualizes the operating angle 2θ. The torque transmission balls 4 of each joint are aligned in the plane that bisects the angle θ by the cage 5, which ensures maintaining constant velocity of both joints.

In the case where the dual type constant velocity universal joint is used for a drive axle, the center in the width direction the adapter flange is substantially positioned at the rotational center of the king pin as described above. However, the joint of the present invention is a dual type constant velocity universal joint that is formed by connecting two BJs. Accordingly, unlike a conventional joint using only one BJ, there is no need for precise position alignment with the axis rotation of the king pin.

Figure 3:
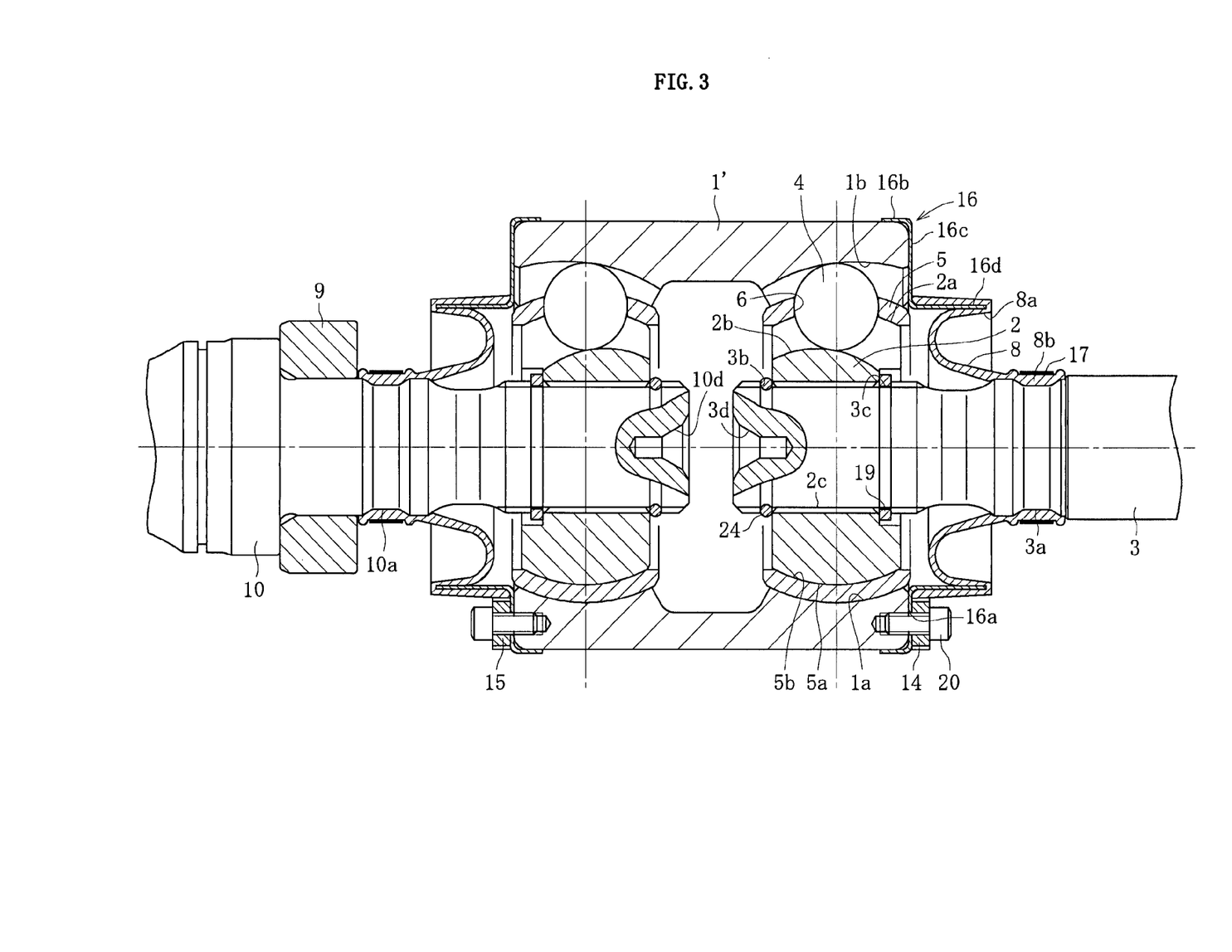
FIG. 3 is a longitudinal sectional view of a dual type constant velocity universal joint according to a second embodiment of the present invention in the state where the operating angle is 0°.
Figure 4:
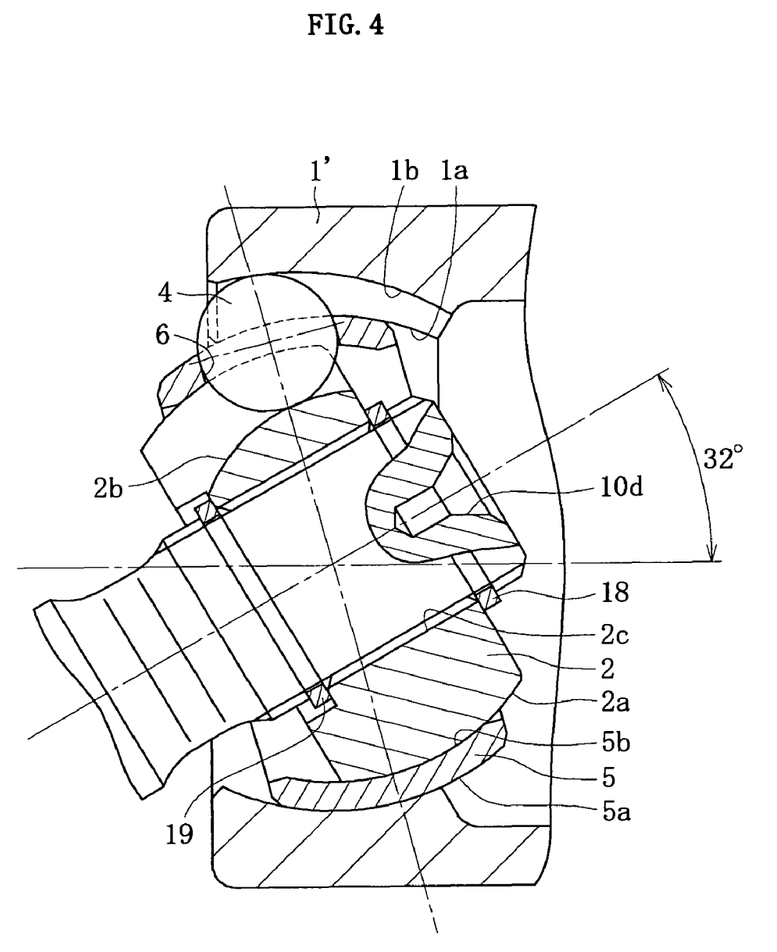
FIG. 4 is a longitudinal sectional view of the case where one of the joints has the operating angle of 32°.

FIG. 3 shows a second embodiment of the present invention, in which an outer ring 1' is of an integrated type and the adapter flange 11 as described before has been omitted. In other words, two outer rings are formed on opposite sides of an integrated cylindrical component. The metal ring 16 of the boot 8 is fixed to the side surface of the outer ring 1' by a hexagonal socket bolt 20. Other elements are the same as those in the first embodiment. Therefore, the same numerals are provided to portions corresponding to the portions in FIG. 1 and FIG. 2, and the description thereof will be omitted. In the meantime, the state in the case where one of the BJs of the second embodiment has the operating angle 32° is shown in FIG. 4. In this state, a disadvantageous situation is generated in which the ball 4 at the rear side of the joint moves to a shallow portion at the rear of the guiding groove 1b, thereby the guiding groove 1b being easily deformed.

Figure 5:
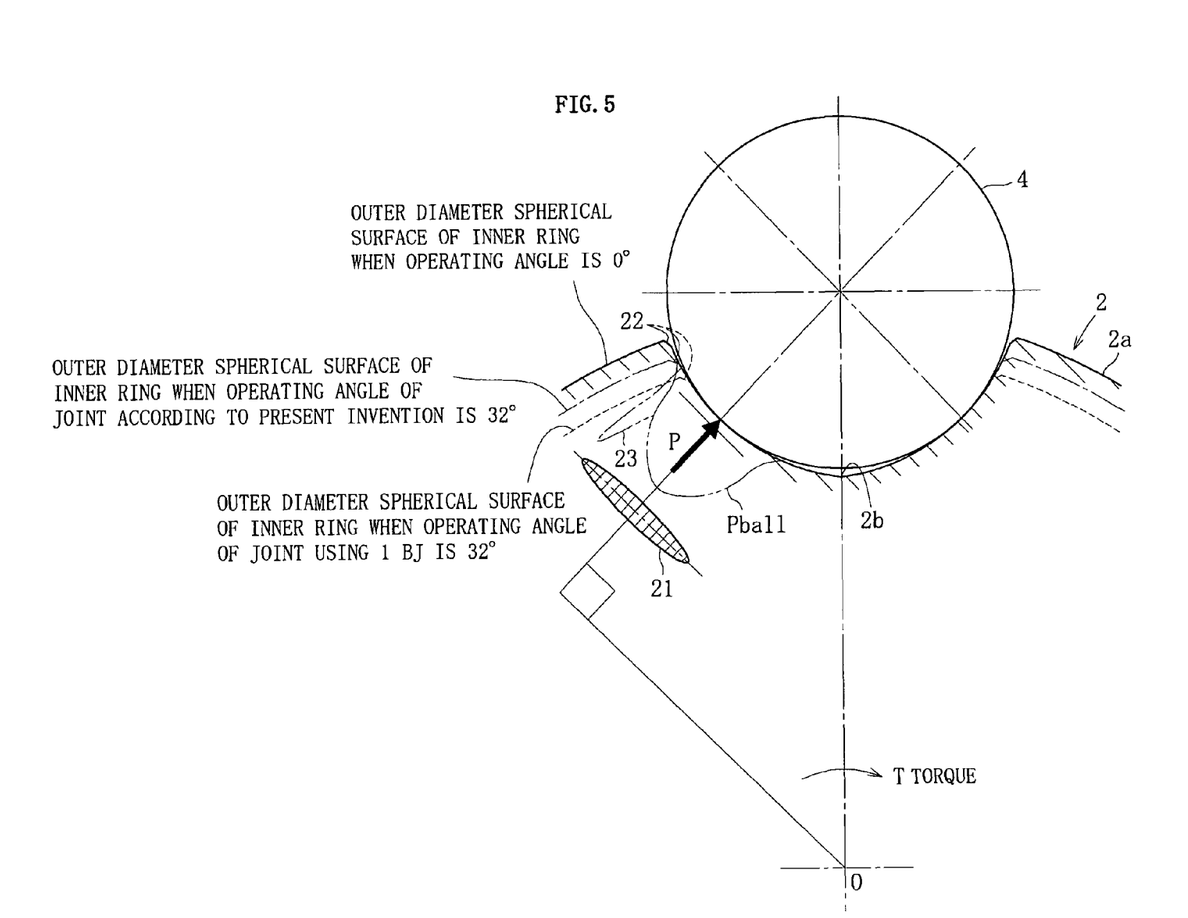
FIG. 5 is a cross sectional view showing a surface pressure in the guiding groove of the inner ring.

The surface pressure at a ball contact point in the guiding groove 2b of the inner ring 2 will now be described. FIG. 5 slightly exaggeratedly shows the relationship between a contact ellipse 21 and a ball contact point surface pressure curve $P_{ball}$. The resultant force of the ball contact point surface pressures is expressed as P. The relationship of force relationship shown in FIG. 5 is common to the first embodiment as described above and the second embodiment. With respect to the ball 4 expressed commonly, the outer diameter spherical surface 2a of the inner ring 2 when the operating angle is 0° is expressed in by the solid line. Meanwhile, the outer diameter spherical surface 2a when the operating angle of a conventional joint using one BJ is 32° is expressed by the dashed line. It is the relationship between the ball 4 at the rear side of the joint and the guiding groove 1b in FIG. 4 that the dotted line indicates.

The outer diameter spherical surface 2a when the operating angle 32° of the joint of the present invention is shown by the dashed-dotted line. In the case where a conventional joint has the operating angle 32°, a shoulder section of the contact ellipse 21 of the ball 4 pushes out a chamfer 22 of the guiding groove 2b. As a result of this, a large load in accordance with excessive torque acts on the ball 4, whereby an edge load 23 causes the outer diameter spherical surface 2a of the inner ring in the vicinity of the ball guiding groove 2b to rise to deform. Such deformation of the outer diameter spherical surface 2a of the inner ring may cause reduced operability of the joint or cause chipping of the edge of the chamfer 22 of the ball guiding groove 2b. According to the dual type constant velocity universal joint of the present invention, since the joint uses two BJs, each BJ requires only half of the operating angle the dual type constant velocity universal joint requires as a whole. Therefore, even when the same operating angle 32° is granted, the outer diameter spherical surface 2a of the inner ring 2 is located at the position as shown by the dashed-dotted line, and accordingly, there is a leeway in the depth of the guiding groove 2b. Therefore, substantially no edge load is generated, which can suppress deformation caused by rising of the outer diameter spherical surface 2a of the inner ring.

Although the embodiments of the present invention have been so far described, the present invention is not limited to the above-described embodiments, and various modifications can be made based on the technical idea as described in the scope of the claims.

INDUSTRIAL APPLICABILITY

A dual type constant velocity universal joint of the present invention is not limited to use in drive axles of rough-terrain crane vehicles or farm tractors. It can also be applicable to drive axles of various vehicles and to industrial machines that require high operating angles.

The invention claimed is:

1. A dual type constant velocity universal joint comprising two constant velocity universal joints, each constant velocity universal joint comprising:
    an outer ring having an inner circumferential surface and a plurality of guiding grooves that extend in an axial direction formed on said inner circumferential surface;
    an inner ring having an outer circumferential surface and a plurality of guiding grooves that extend in an axial direction formed on said outer circumferential surface;
    a plurality of balls for torque transmission;
    a cage for holding said balls; and
    a boot having a metal ring, said boot being disposed on a front side of said constant velocity universal joint which accepts a shaft and covering a portion between an outer circumferential surface of said outer ring and the shaft,
    wherein said guiding grooves in said inner circumferential surface of said outer ring are coordinated with said guiding grooves in said outer circumferential surface of said inner ring to form a plurality of ball tracks,
    wherein each of said ball tracks has a wedge shape that opens toward a back side of said constant velocity universal joint which is opposite to said front side, and
    wherein said outer rings of said two constant velocity universal joints are formed as separate bodies and are coaxially integrated together at said back sides.

2. A dual type constant velocity universal joint according to claim 1, wherein said two constant velocity universal joints are integrated via a disk-shaped adapter flange inserted therebetween, said disk-shaped adapter flange having a center through-hole, and
    wherein a plurality of bolts are passed through said outer rings of both constant velocity joints and said adapter flange.

3. A dual type constant velocity universal joint according to claim 1, wherein said guiding grooves of said outer ring have a radius of curvature,
    wherein said guiding grooves of said inner ring have a radius of curvature, and
    wherein a center of said radius of curvature of said guiding grooves of said outer ring is offset in an axial direction from a center of said radius of curvature of said guiding grooves of said inner ring.

4. A dual type constant velocity universal joint according to claim 1, wherein said guiding grooves of said outer ring have a radius of curvature,
    wherein said guiding grooves of said inner ring have a radius of curvature,
    wherein a center of said radius of curvature of said guiding grooves of said outer ring is offset from a center of said constant velocity universal joint by a predetermined distance in a first axial direction, and
    wherein a center of said radius of curvature of said guiding grooves of said inner ring is offset from said center of said constant velocity universal joint by said predetermined distance in a second axial direction opposite to said first axial direction.

5. A dual type constant velocity universal joint according to claim 1, wherein said guiding grooves of said outer ring have a radius of curvature,
    wherein said guiding grooves of said inner ring have a radius of curvature,
    wherein a center of said radius of curvature of said guiding grooves of said outer ring is offset from a center of said constant velocity universal joint by a predetermined distance in an axial direction toward said back side, and
    wherein a center of said radius of curvature of said guiding grooves of said inner ring is offset from said center of said constant velocity universal joint by said predetermined distance in an axial direction toward said front side.

6. A dual type constant velocity universal joint according to claim 1, wherein said outer ring is a cylindrical outer ring, said inner circumferential surface of said cylindrical outer ring is annular, and said outer circumferential surface of said inner ring is annular.

7. A dual type constant velocity universal joint according to claim 1, wherein said outer rings are connected together such that one outer ring is not rotatable relative to the other.

8. A dual type constant velocity universal joint comprising two constant velocity universal joints, each constant velocity universal joint comprising:
    an outer ring having an inner circumferential surface and a plurality of guiding grooves that extend in an axial direction formed on said inner circumferential surface;
    an inner ring having an outer circumferential surface and a plurality of guiding grooves that extend in an axial direction formed on said outer circumferential surface;
    a plurality of balls for torque transmission;
    a boot being disposed on a front side of said constant velocity universal joint which accepts a shaft and covering a portion between an outer circumferential surface of said outer ring and the shaft, wherein said guiding grooves in said inner circumferential surface of said outer ring are coordinated with said guiding grooves in said outer circumferential surface of said inner ring to form a plurality of ball tracks, wherein each of said ball tracks has a wedge shape that opens toward a back side of said constant velocity universal joint which is opposite to said front side, wherein said outer rings of said two constant velocity universal joints are formed as separate bodies and are coaxially integrated together at said back sides, wherein said outer rings are connected together such that one outer ring is not rotatable relative to the other, wherein said guiding grooves of said outer ring have a radius of curvature, wherein said guiding grooves of said inner ring have a radius of curvature, wherein a center of said radius of curvature of said guiding grooves of said outer ring is offset from a center of said constant velocity universal joint by a predetermined distance in an axial direction toward said back side, and wherein a center of said radius of curvature of said guiding grooves of said inner ring is offset from said center of said constant velocity universal joint by said predetermined distance in an axial direction toward said front side.

* * * * *